(12) United States Patent
Piao et al.

(10) Patent No.: US 10,693,140 B2
(45) Date of Patent: Jun. 23, 2020

(54) NEGATIVE ELECTRODE, AND SECONDARY BATTERY, BATTERY MODULE, AND BATTERY PACK INCLUDING THE SAME

(71) Applicant: LG CHEM, LTD., Seoul (KR)

(72) Inventors: Lilin Piao, Daejeon (KR); Eun Kyung Kim, Daejeon (KR); Sun Young Shin, Daejeon (KR); Su Min Lee, Daejeon (KR); Su Yeon Lee, Daejeon (KR); Chang Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 14 days.

(21) Appl. No.: 16/085,457

(22) PCT Filed: Sep. 12, 2017

(86) PCT No.: PCT/KR2017/010007
§ 371 (c)(1),
(2) Date: Sep. 14, 2018

(87) PCT Pub. No.: WO2018/052234
PCT Pub. Date: Mar. 22, 2018

(65) Prior Publication Data
US 2019/0088947 A1 Mar. 21, 2019

(30) Foreign Application Priority Data

Sep. 13, 2016 (KR) .......... 10-2016-0118174
Sep. 11, 2017 (KR) .......... 10-2017-0116084

(51) Int. Cl.
*H01M 4/583* (2010.01)
*H01M 4/133* (2010.01)
(Continued)

(52) U.S. Cl.
CPC ......... *H01M 4/583* (2013.01); *H01M 2/1077* (2013.01); *H01M 4/133* (2013.01);
(Continued)

(58) Field of Classification Search
CPC .............................. H01M 4/583; H01M 4/133
See application file for complete search history.

(56) References Cited

U.S. PATENT DOCUMENTS

2004/0115117 A1* 6/2004 Takei ................... H01M 4/133
423/448
2005/0266314 A1 12/2005 Sheem et al.
(Continued)

FOREIGN PATENT DOCUMENTS

EP 3054509 A1 8/2016
JP 9-27314 A 1/1997
(Continued)

OTHER PUBLICATIONS

International Search Report issued in PCT/KR2017/010007 (PCT/ISA/210), dated Mar. 19, 2018.
(Continued)

*Primary Examiner* — Matthew J Merkling
(74) *Attorney, Agent, or Firm* — Birch, Stewart, Kolasch & Birch, LLP

(57) ABSTRACT

The present invention relates to a negative electrode and a secondary battery including the same, and particularly, to a negative electrode which includes a negative electrode active material layer including first active material particles each in the form of a secondary particle in which a plurality of primary particles are agglomerated; and second active material particles, wherein the second active material particles have an average particle size ($D_{50}$) equal to or less than an average particle size ($D_{50}$) of the primary particles, the first active material particle is artificial graphite, and the second active material particle is a graphite-based particle, and a secondary battery, a battery module, and a battery pack including the same.

13 Claims, 1 Drawing Sheet

(51) Int. Cl.
  *H01M 4/587* (2010.01)
  *H01M 4/36* (2006.01)
  *H01M 2/10* (2006.01)
  *H01M 4/62* (2006.01)
  *H01M 10/0525* (2010.01)
  *H01M 4/02* (2006.01)

(52) U.S. Cl.
  CPC .......... *H01M 4/364* (2013.01); *H01M 4/587* (2013.01); *H01M 4/622* (2013.01); *H01M 10/0525* (2013.01); *H01M 2004/021* (2013.01); *H01M 2004/027* (2013.01); *H01M 2220/10* (2013.01); *H01M 2220/20* (2013.01)

(56) References Cited

U.S. PATENT DOCUMENTS

| | | | |
|---|---|---|---|
| 2006/0073387 | A1 | 4/2006 | Sakagoshi et al. |
| 2010/0273050 | A1 | 10/2010 | Sheem et al. |
| 2012/0094175 | A1 | 4/2012 | Sheem et al. |
| 2016/0276657 | A1 | 9/2016 | Song et al. |
| 2017/0117539 | A1* | 4/2017 | Ogata ................. H01M 4/0471 |
| 2017/0133679 | A1* | 5/2017 | Ko ........................ H01M 4/133 |
| 2018/0151869 | A1* | 5/2018 | Matsuhara ............ H01M 4/133 |

FOREIGN PATENT DOCUMENTS

| | | | |
|---|---|---|---|
| JP | 3084256 | B2 | 9/2000 |
| JP | 2007-173156 | A | 7/2007 |
| JP | 4933092 | B2 | 5/2012 |
| JP | 2013-30355 | A | 2/2013 |
| KR | 10-2005-0100505 | A | 10/2005 |
| KR | 10-0578868 | B1 | 5/2006 |
| KR | 10-2007-0040853 | A | 4/2007 |
| KR | 10-1225879 | B1 | 1/2013 |
| KR | 10-1225882 | B1 | 1/2013 |
| KR | 10-1283962 | B1 | 7/2013 |
| KR | 10-2014-0008982 | A | 1/2014 |
| KR | 10-2014-0009928 | A | 1/2014 |

OTHER PUBLICATIONS

Extended European Search Report, dated Apr. 18, 2019, for European Application No. 17851108.5.

\* cited by examiner

NEGATIVE ELECTRODE, AND SECONDARY BATTERY, BATTERY MODULE, AND BATTERY PACK INCLUDING THE SAME

CROSS-REFERENCE TO RELATED APPLICATION

This application claims priority to and the benefit of Korean Patent Application No. 10-2016-0118174, filed on Sep. 13, 2016, and Korean Patent Application No. 10-2017-0116084, filed on Sep. 11, 2017, the disclosures of which are incorporated herein by reference in their entirety.

TECHNICAL FIELD

The present invention relates to a negative electrode, and a secondary battery, a battery module, and a battery pack including the same. Here, the negative electrode includes first active material particles each in the form of a secondary particle in which a plurality of primary particles are agglomerated and second active material particles having an average particle size ($D_{50}$) equal to or less than an average particle size ($D_{50}$) of the primary particles.

BACKGROUND ART

With a rapid increase in the use of fossil fuels, there is an increasing demand for use of alternative energy or clean energy. The field of electricity generation and accumulation using an electrochemical reaction has been most actively studied to meet the increasing demand.

As a representative example of electrochemical devices using such electrochemical energy, secondary batteries are currently used and an application area thereof has gradually been increased. Recently, with an increase in development of technology and demand for portable devices, such as portable computers, mobile phones, cameras, and the like, demand for secondary batteries as energy sources is rapidly increasing. Among such secondary batteries, much research on lithium secondary batteries, which have high energy density, high operating potential, a long cycle lifespan, and a low self-discharge rate, has been conducted, and such lithium secondary batteries are commercially available and widely used.

Generally, a secondary battery consists of a positive electrode, a negative electrode, an electrolyte, and a separator. In the secondary battery, lithium ions released from a positive electrode active material are intercalated into a negative electrode active material such as a carbon particle through $1^{st}$ charging and the lithium ions are deintercalated through discharging. As lithium ions reciprocate between the positive electrode and the negative electrode as such, they transfer energy. Therefore, the secondary battery can be charged and discharged.

Artificial graphite is one of the negative electrode active materials commonly used to improve charging and discharging characteristics of a battery due to its excellent ability to absorb lithium ions. However, artificial graphite has a problem in that cohesion between artificial graphite particles and adhesion between an artificial graphite particle and a current collector are poor.

Korean Unexamined Patent Publication No. 10-2014-0008982 discloses the use of a binder having a specific viscosity and including a copolymer of a hydrophilic monomer and a hydrophobic monomer to improve cohesion and adhesion. However, even when the binder is used, cohesion between artificial graphite particles and adhesion between an artificial graphite particle and a current collector are not sufficiently exhibited because the binder is disposed in a concave portion of a surface of artificial graphite when artificial graphite in the form of a secondary particle with an irregular surface is used.

Therefore, a negative electrode, which sufficiently exhibits cohesion between artificial graphite particles and adhesion between an artificial graphite particle and a current collector even when artificial graphite in the form of a secondary particle with an irregular surface is used, is required.

Prior-Art Document (Patent Document 1) Korean Unexamined Patent Publication No. 10-2014-0008982

DISCLOSURE

Technical Problem

It is an aspect of the present invention to provide a negative electrode capable of improving the charging and discharging performance of a battery and mechanical stability of an electrode, and a secondary battery including the same.

Technical Solution

In order to accomplish the above objectives, according to an embodiment of the present invention, there is provided a negative electrode which includes a negative electrode active material layer including first active material particles each in the form of a secondary particle in which primary particles are agglomerated; and second active material particles, wherein the second active material particles have an average particle size ($D_{50}$) equal to or less than an average particle size ($D_{50}$) of the primary particles, the first active material particle is artificial graphite, and the second active material particle is a graphite-based particle.

In addition, according to another embodiment of the present invention, there are provided a secondary battery including the negative electrode, a battery module including the secondary battery, and a battery pack including the battery module.

Advantageous Effects

In the present invention, the charging and discharging performance of a secondary battery including a negative electrode can be improved by using artificial graphite. Also, the artificial graphite is in the form of a secondary particle in which primary particles are agglomerated, and the negative electrode includes the artificial graphite and graphite-based particles having an average particle size ($D_{50}$) equal to or less than an average particle size ($D_{50}$) of the primary particles, and thus an amount of a binder disposed in a concave portion of a surface of the secondary particles is decreased, thereby cohesion between artificial graphite particles and adhesion between an artificial graphite particle and a current collector can be improved.

BEST MODE

Figure 1:
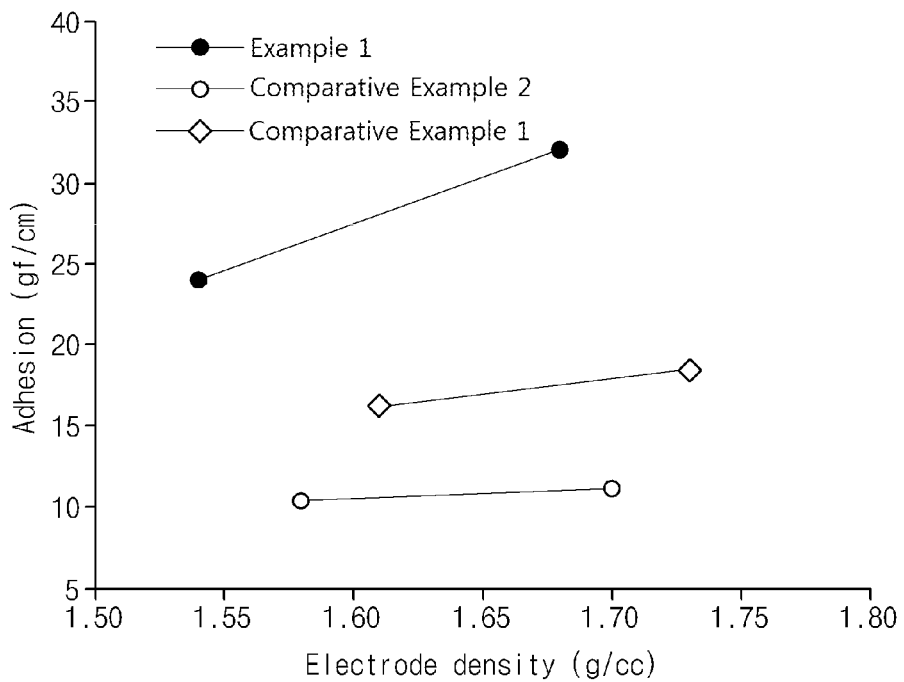
FIG. 1 is a graph illustrating the results obtained by evaluating electrode adhesion according to Example 1 of the present invention and Comparative Examples 1 and 2.

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

A negative electrode according to an embodiment of the present invention may include a negative electrode active material layer including first active material particles each in the form of a secondary particle in which a plurality of primary particles are agglomerated; and second active material particles, wherein the second active material particles may have an average particle size ($D_{50}$) equal to or less than an average particle size ($D_{50}$) of the primary particles, the first active material particle may be artificial graphite, and the second active material particle may be a graphite-based particle.

The first active material particle may be artificial graphite. The artificial graphite has an excellent ability to absorb lithium ions, compared to natural graphite. Therefore, when the first active material particle is artificial graphite, charging and discharging characteristics of a battery may be improved.

The first active material particle may be in the form of a secondary particle in which a plurality of primary particles are agglomerated.

The primary particles may have an average particle size ($D_{50}$) of 5 μm to 20 μm, particularly 7 μm to 20 μm, and more particularly 9 μm to 20 μm. When the primary particles have an average particle size ($D_{50}$) of less than 5 μm, the capacity of a battery may be decreased, and the volume of an electrode may be excessively expanded during charging and discharging. When the primary particles have an average particle size ($D_{50}$) of greater than 20 μm, adhesion between a negative electrode active material layer and a current collector and cohesion between particles in a negative electrode active material layer may be degraded. The average particle size ($D_{50}$) can be defined as a particle size corresponding to the 50$^{th}$ percentile in the particle size distribution. The average particle size ($D_{50}$) may be measured, for example, by using a laser diffraction method. Through the laser diffraction method, a particle size ranging from a submicron region to several mm may be generally measured, and a result having high reproducibility and high resolvability may be obtained.

The first active material particle may be in the form of a secondary particle, and the secondary particle may be formed by agglomerating a plurality of primary particles. Specifically, the first active material particle may be formed by agglomerating at least two primary particles. The first active material particle may have an irregular surface. For example, the first active material particle may be in the form of a flake or a spike.

The first active material particles may have a specific surface area of, for example, 1.3 m$^2$/g to 1.5 m$^2$/g, particularly 1.3 m$^2$/g to 1.4 m$^2$/g. In the present specification, the specific surface area may be measured by a BET method.

The first active material particle may be prepared as follows. For example, the first active material particle in the form of a secondary particle may be prepared by mixing primary particles with pitch as a binder (0.5 wt % to 15 wt %) and performing an assembly process. Also, the primary particle may be prepared by graphitizing petroleum-based needle coke at 3,000° C. or more. In some cases, the first active material particle may be prepared by coating a surface of a secondary particle with soft carbon after the assembly process. However, the first active material particle does not need to be formed by the above-described methods.

The first active material particles may have an average particle size ($D_{50}$) of 10 μm to 35 μm, particularly 12 μm to 35 μm, and more particularly 14 μm to 33 μm. When the first active material particles have an average particle size ($D_{50}$) of less than 10 μm, the capacity of a battery may be decreased, and the volume of an electrode may be excessively expanded during charging and discharging. When the first active material particles have an average particle size ($D_{50}$) of greater than 35 μm, resistance may be increased as the migration distance of a lithium ion increases, and thus output characteristics may be degraded, and adhesion between a negative electrode active material layer and a current collector and cohesion between particles in a negative electrode active material layer may also be degraded.

The second active material particle may be a graphite-based particle. Specifically, the graphite-based particle may be at least one selected from the group consisting of artificial graphite, natural graphite, graphitized carbon fiber, and graphitized mesocarbon microbeads.

The second active material particles have an average particle size ($D_{50}$) equal to or less than an average particle size ($D_{50}$) of the primary particles.

In order to improve cohesion between active material particles and adhesion between an active material particle and a current collector, the negative electrode active material layer generally includes a binder. However, when the negative electrode active material layer does not include the second active material particles, a binder is easily disposed in a concave portion of an irregular surface of the first active material particle in the form of a secondary particle or the inside of the first active material particle, and thus an amount of a binder which comes in contact with a plurality of first active material particles or with a first active material particle and a current collector at the same time is insufficient. Therefore, cohesion between first active material particles and adhesion between a first active material particle and a current collector are insufficient, and thus mechanical stability of a battery may be degraded.

In addition, even when the negative electrode active material layer includes the second active material particles, the second active material particles do not fill a concave portion of an irregular surface of the first active material particle and the inside of the first active material particle when the second active material particles have an average particle size ($D_{50}$) higher than that of primary particles of the first active material particles. Accordingly, an amount of a binder which comes in contact with a plurality of first active material particles or with a first active material particle and a current collector at the same time is still insufficient. For this reason, mechanical stability of a battery may be degraded.

On the other hand, the negative electrode according to an embodiment of the present invention includes first active material particles and second active material particles, and the second active material particles have an average particle size ($D_{50}$) equal to or less than an average particle size ($D_{50}$) of the primary particles. Therefore, the second active material particles may sufficiently fill a concave portion of an irregular surface of the first active material particle and the inside of the first active material particle. Accordingly, since an amount of a binder which is disposed in the concave portion or inside of the first active material particle may be decreased, an amount of a binder which comes in contact with a plurality of first active material particles or with a first active material particle and a current collector at the same time may be relatively increased. Therefore, cohesion between first active material particles and adhesion between a first active material particle and a current collector may be improved, thus, mechanical stability of a battery may be improved.

Specifically, an average particle size ($D_{50}$) of the second active material particles may be 14% to 95%, particularly 20% to 60%, and more particularly 27% to 50% of an average particle size ($D_{50}$) of the primary particles. When an average particle size ($D_{50}$) of the second active material particles is 14% to 95% of an average particle size ($D_{50}$) of the primary particles, a sufficient amount of a binder which comes in contact with a plurality of first active material particles or with a first active material particle and a current collector at the same time may be ensured. Therefore, cohesion between first active material particles and adhesion between a first active material particle and a current collector may be further improved, thus, mechanical stability of a battery may be further improved.

The second active material particles may have an average particle size ($D_{50}$) of 5 μm to 12 μm.

The second active material particles may have a specific surface area of 1.4 $m^2$/g to 1.6 $m^2$/g, particularly 1.4 $m^2$/g to 1.5 $m^2$/g.

The second active material particles may be included at 20 wt % to 90 wt %, particularly 40 wt % to 80 wt %, and more particularly 50 wt % to 70 wt % with respect to the total weight of the first active material particles and the second active material particles. When the second active material particles are included at less than 20 wt %, the second active material particles do not sufficiently fill a concave portion of an irregular surface of the first active material particle and the inside of the first active material particle, and thus an amount of a binder which comes in contact with a plurality of first active material particles or with a first active material particle and a current collector at the same time is insufficient, thereby mechanical stability of a battery may be degraded. When the second active material particles are included at greater than 90 wt %, an electrode may be excessively expanded during charging and discharging of a battery.

The total weight of the first active material particles and the second active material particles may be 90 wt % to 99.9 wt %, particularly 95 wt % to 99.5 wt %, and more particularly 96 wt % to 99 wt % with respect to the total weight of the negative electrode active material layer.

The negative electrode active material layer may further include a binder. The binder improves cohesion between the first active material particles and adhesion between the first active material particle and a current collector, and thus may serve to improve mechanical stability of a battery.

As the binder, any of various types of binder polymers such as a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene monomer (EPDM), a sulfonated EPDM, styrene-butadiene rubber (SBR), fluororubber, polyacrylic acid, a polymer in which hydrogen atoms of the above polymers are substituted with Li, Na, Ca or the like, various copolymers, and the like may be used.

The negative electrode active material layer may further include a conductive material. The conductive material is not particularly limited as long as it does not cause a chemical change in the battery and has conductivity. For example, graphite such as natural graphite, artificial graphite, or the like; a carbon black such as acetylene black, Ketjen black, channel black, furnace black, lamp black, thermal black, or the like; a conductive fiber such as carbon fiber, metallic fiber, or the like; a conductive tube such as carbon nanotubes or the like; metallic powder such as carbon fluoride powder, aluminum powder, nickel powder, or the like; a conductive whisker such as zinc oxide, potassium titanate, or the like; a conductive metal oxide such as titanium oxide or the like; or a conductive material such as a polyphenylene derivative or the like may be used. The conductive material may be carbon black, particularly, carbon black having an average particle size of several tens of nanometers.

When the conductive material is included in the negative electrode active material layer, the conductive material may be included at 0.01 wt % to 10 wt %, particularly 0.01 wt % to 5 wt %, and more particularly 0.1 wt % to 2 wt % with respect to the total weight of the negative electrode active material layer.

The negative electrode active material layer may further include a thickening agent. As the thickening agent, at least one of carboxymethyl cellulose (CMC), carboxyethyl cellulose, starches, regenerated cellulose, ethyl cellulose, hydroxylmethyl cellulose, hydroxylethyl cellulose, hydroxypropyl cellulose, and polyvinyl alcohol may be used. Preferably, CMC is used.

The negative electrode may further include a current collector. The negative electrode active material layer may be disposed on the current collector, particularly, on one surface or both surfaces of the current collector. The current collector does not cause a chemical change in the secondary battery and has conductivity. For example, copper, stainless steel, aluminum, nickel, titanium, calcined carbon, aluminum or stainless steel whose surface is treated with carbon, nickel, titanium, silver, or the like may be used as the current collector.

The negative electrodes according to embodiments of the present invention may be manufactured by applying a slurry prepared by mixing an electrode mixture including first active material particles, second active material particles, a conductive material, and a binder in a solvent on a current collector, followed by drying and rolling. Here, the first active material particles, second active material particles, conductive material, and binder may be the same as the above-described first active material particles, second active material particles, conductive material, and binder.

The solvent may be a solvent generally used in the art, and may be one or a mixture of two or more of dimethyl sulfoxide (DMSO), isopropyl alcohol, N-methylpyrrolidone (NMP), acetone, water, and the like.

A secondary battery according to another embodiment of the present invention may include a negative electrode, a positive electrode, a separator interposed between the positive electrode and the negative electrode, and an electrolyte. Here, the negative electrode may be the negative electrode according to an embodiment of the present invention.

The positive electrode may include a positive electrode current collector and a positive electrode active material layer formed on the positive electrode current collector and including a positive electrode active material.

In the positive electrode, the positive electrode current collector is not particularly limited as long as it does not cause a chemical change in the battery and has conductivity. For example, stainless steel, aluminum, nickel, titanium, calcined carbon, aluminum or stainless steel whose surface is treated with carbon, nickel, titanium, silver, or the like may be used. Also, the positive electrode current collector may commonly have a thickness of 3 to 500 μm, and may have fine irregularities at a surface thereof to increase adhesion of the positive electrode active material. For example, the positive electrode current collector may be used in any of various forms such as a film, a sheet, a foil, a net, a porous material, a foam, a non-woven fabric, and the like.

The positive electrode active material may be a commonly used positive electrode active material. Specifically, the positive electrode active material may be a layered compound such as a lithium cobalt oxide ($LiCoO_2$), a lithium nickel oxide ($LiNiO_2$), or the like, or a compound substituted with one or more transition metals; a lithium iron oxide such as $LiFe_3O_4$ or the like; a lithium manganese oxide such as a compound represented by $Li_{1+c1}Mn_{2-c1}O_4$ ($0 \leq c1 \leq 0.33$), $LiMnO_3$, $LiMn_2O_3$, $LiMnO_2$, or the like; a lithium copper oxide such as $Li_2CuO_2$; a vanadium oxide such as $LiV_3O_8$, $V_2O_5$, $Cu_2V_2O_7$, or the like; a Ni site-type lithium nickel oxide represented by $LiNi_{1-c2}M_{c2}O_2$ (here, M is at least one selected from the group consisting of Co, Mn, Al, Cu, Fe, Mg, B, and Ga, and c2 satisfies $0.01 \leq c2 \leq 0.3$); a lithium manganese composite oxide represented by $LiMn_{2-c3}M_{c3}O_2$ (here, M is at least one selected from the group consisting of Co, Ni, Fe, Cr, Zn, and Ta, and c3 satisfies $0.01 \leq c3 \leq 0.1$) or $Li_2Mn_3MO_8$ (here, M is at least one selected from the group consisting of Fe, Co, Ni, Cu, and Zn); or $LiMn_2O_4$ in which a part of Li in the chemical formula is substituted with alkaline earth metal ions, but the present invention is not limited thereto. The positive electrode may be Li-metal.

The positive electrode active material layer may include a positive electrode conductive material and a positive electrode binder in addition to the above-described positive electrode active material.

In this case, the positive electrode conductive material is a component for imparting the conductivity to the electrode and is not particularly limited as long as it does not cause a chemical change in the battery and has electronic conductivity. For example, one or a mixture of two or more of graphite such as natural graphite, artificial graphite, or the like; a carbon-based material such as carbon black, acetylene black, Ketjen black, channel black, furnace black, lamp black, thermal black, carbon fiber, or the like; metallic powder or metallic fiber including copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like may be used as the positive electrode conductive material.

In addition, the positive electrode binder serves to improve cohesion between positive electrode active material particles and adhesion between a positive electrode active material and a positive electrode current collector. For example, one or a mixture of two or more of polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene monomer (EPDM), a sulfonated EPDM, styrene-butadiene rubber (SBR), fluororubber, various copolymers thereof, and the like may be used as the positive electrode binder.

The separator serves to separate the negative electrode and the positive electrode and provide a flow passage for lithium ions. The separator is not particularly limited as long as it is used as a separator in a common secondary battery, and particularly, a separator which exhibits low resistance to the migration of electrolyte ions and has an excellent ability to absorb an electrolyte is preferable. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof may be used as the separator. Alternatively, a common porous non-woven fabric, for example, a non-woven fabric made of high-melting point glass fiber, polyethylene terephthalate fiber, or the like may be used as the separator. Also, in order to ensure heat resistance or mechanical strength, a coated separator including ceramic components or polymer materials may be used, and the separator may have a single-layer or multi-layer structure.

The electrolyte may be an organic liquid electrolyte, an inorganic liquid electrolyte, a solid polymer electrolyte, a gel-type polymer electrolyte, an inorganic solid electrolyte, a molten-type inorganic electrolyte, or the like, which may be used in the manufacture of a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, an ether, methyl propionate, ethyl propionate, or the like may be used.

Particularly, among the carbonate-based organic solvents, ethylene carbonate and propylene carbonate, which are cyclic carbonate compounds, are preferably used because they are high-viscosity organic solvents and dissociate a lithium salt effectively due to their high dielectric constant. It is more preferable that such a cyclic carbonate compound is used in combination with a linear carbonate compound having low viscosity and a low dielectric constant such as dimethyl carbonate and diethyl carbonate in an appropriate ratio because an electrolyte having high electrical conductivity may be formed.

The metal salt may be a lithium salt, which is a material that is readily soluble in the non-aqueous electrolyte. For example, the lithium salt may include, as an anion, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, for the purpose of improving lifespan characteristics of the battery, suppressing a decrease in battery capacity, improving discharge capacity of the battery, and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride, and the like.

According to still another embodiment of the present invention, there are provided a battery module including the secondary battery as a unit cell and a battery pack including the same. The battery module and the battery pack include the secondary battery having high capacity, high rate characteristics, and high cycle characteristics, and thus may be used as a power source for medium- to large-sized devices selected from the group consisting of an electric vehicle, a hybrid electric vehicle, a plug-in hybrid electric vehicle, and a power storage system.

MODE FOR INVENTION

Hereinafter, preferred embodiments of the present invention will be described in order to aid in understanding the present invention. However, it should be apparent to those skilled in the art that the description proposed herein is just a preferable example for the purpose of illustration only, and is not intended to limit or define the scope of the invention. Therefore, it should be understood that various changes and modifications can be made to the exemplary embodiments of the present invention without departing from the scope of the present invention, so that the present invention covers all such changes and modifications provided they are within the scope of the appended claims and their equivalents.

EXAMPLE AND COMPARATIVE EXAMPLES

Preparation Example 1: Preparation of First Active Material Particles

<Preparation of First Active Material Particle>

Artificial graphite having an average particle size ($D_{50}$) of 10.6 μm was used as a primary particle.

The primary particles and pitch as a binder were mixed to prepare a mixture, and an assembly process was performed. In this case, the pitch was used at 4 wt % with respect to the total weight of the mixture. Through the assembly process, first active material particles each in the form of a secondary particle having an average particle size ($D_{50}$) of 15 μm and a specific surface area of 1.4 m$^2$/g were prepared.

Example 1 and Comparative Examples 1 to 3: Manufacture of Negative Electrode

Example 1

Artificial graphite having an average particle size ($D_{50}$) of 10 μm as a second active material particle, styrene-butadiene rubber (SBR) as a binder, Super C65 as a conductive material, and carboxymethyl cellulose (CMC) as a thickening agent were used.

1.68 g of the conductive material and 54.95 g of the thickening agent were mixed and dispersed at 2,500 rpm for 10 minutes. Subsequently, 96 g of the first active material particles prepared in Preparation Example 1 and 64 g of the second active material particles were added thereto and then stirred at 70 rpm for 30 minutes. Afterward, 54.95 g of the thickening agent was added and stirred at 70 rpm for 30 minutes, 73.26 g of the thickening agent was additionally added and stirred at 70 rpm for 10 minutes, and then 10.49 g of the binder was added to prepare a negative electrode slurry having a solid content of 47.3%.

The negative electrode slurry was applied on a copper (Cu) thin film having a thickness of 20 μm, which is a negative electrode current collector, at a loading amount of 266 mg/25 cm$^2$. In this case, the temperature of circulating air was 70° C. Subsequently, the applied slurry was dried in a 60° C. vacuum oven for 12 hours, then roll-pressed, and dried in a 130° C. vacuum oven for 8 hours. As a result, a negative electrode having a width of 10 mm was manufactured.

Comparative Example 1

A negative electrode was manufactured in the same manner as in Example 1 except that 160 g of the first active material particles prepared in Preparation Example 1 was used alone as an active material without use of the second active material particles in Example 1.

Comparative Example 2

A negative electrode was manufactured in the same manner as in Example 1 except that 160 g of the second active material particles was used alone as an active material without use of the first active material particles in Example 1.

Comparative Example 3

Artificial graphite having an average particle size ($D_{50}$) of 20.9 μm as a second active material particle, styrene-butadiene rubber (SBR) as a binder, Super C65 as a conductive material, and CMC as a thickening agent were used.

1.68 g of the conductive material and 54.95 g of the thickening agent were mixed and dispersed at 2,500 rpm for 10 minutes. Subsequently, 96 g of the first active material particles prepared in Preparation Example 1 and 64 g of the second active material particles were added thereto and then stirred at 70 rpm for 30 minutes. Afterward, 54.95 g of the thickening agent was added and stirred at 70 rpm for 30 minutes, 73.26 g of the thickening agent was additionally added and stirred at 70 rpm for 10 minutes, and then 10.49 g of the binder was added to prepare a negative electrode slurry having a solid content of 47.3%.

The negative electrode slurry was applied on a copper (Cu) thin film having a thickness of 20 μm, which is a negative electrode current collector, at a loading amount of 266 mg/25 cm². In this case, the temperature of circulating air was 70° C. Subsequently, the applied slurry was dried in a 60° C. vacuum oven for 12 hours, then roll-pressed, and dried in a 130° C. vacuum oven for 8 hours. As a result, a negative electrode having a width of 10 mm was manufactured.

Experimental Example 1: Evaluation of Electrode Adhesion 1

Each of the negative electrodes according to Example 1 and Comparative Examples 1 and 2 was rolled, dried in a vacuum oven at 130° C. for 8 hours, and then a 10 mm×150 mm sample was punched out. Afterward, the negative electrode sample was adhered to a center of a 25 mm×75 mm slide glass using a tape, and then 180 degree peel strength was measured while the negative electrode current collector was peeled off using a universal testing machine (UTM). The 180 degree peel strength was measured at each electrode density, and then a graph illustrating a result thereof is shown in FIG. 1.

Referring to FIG. 1, it can be confirmed that the negative electrode according to Example 1, in which first active material particles and second active material particles having an average particle size equal to or less than an average particle size of the first active material particles were used in combination, exhibited much higher electrode adhesion. On the other hand, it can be confirmed that Comparative Example 1 in which only first active material particles were used or Comparative Example 2 in which only second active material particles were used exhibited significantly lower electrode adhesion compared to Example 1.

Experimental Example 2: Evaluation of Electrode Adhesion 2

Each of the negative electrodes according to Example 1 and Comparative Example 3 was rolled, dried in a vacuum oven at 130° C. for 8 hours, and then a 10 mm×150 mm sample was punched out. Afterward, the negative electrode sample was adhered to a center of a 25 mm×75 mm slide glass using a tape, and then 180 degree peel strength was measured while the negative electrode current collector was peeled off using a UTM, the result of which is shown in FIG. 2.

Figure 2:
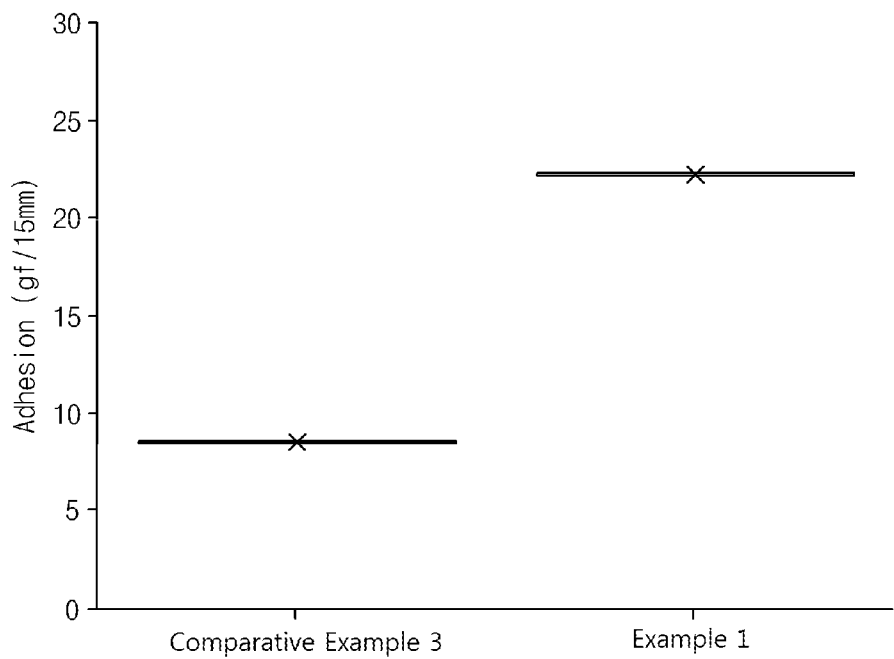
FIG. 2 is a graph illustrating the results obtained by evaluating electrode adhesion according to Example 1 of the present invention and Comparative Example 3.

Referring to FIG. 2, it can be seen that Example 1 exhibited much higher electrode adhesion than Comparative Example 3. In the case of Comparative Example 3, second active material particles did not sufficiently fill a concave portion of an irregular surface of a first active material particle and the inside of a first active material particle due to their excessively large size. Therefore, it can be seen that a binder was deeply disposed in the concave portion or inside of a first active material particle, and thus an amount of a binder present between particles in an active material layer and between a current collector and a particle was relatively decreased, resulting in low electrode adhesion.

While exemplary embodiments have been described above in detail, the scope of the present invention is not limited thereto, but encompasses several modifications and improvements by those skilled in the art using basic concepts of embodiments of the present invention defined by the appended claims.

The invention claimed is:

1. A negative electrode comprising a negative electrode active material layer comprising:
   first active material particles each in a form of a secondary particle in which a plurality of primary particles are agglomerated; and
   second active material particles,
   wherein the second active material particles have an average particle size ($D_{50}$) equal to or less than an average particle size ($D_{50}$) of the primary particles,
   the first active material particle is artificial graphite,
   the second active material particle is a graphite-based particle, and
   wherein the second active material particles have an average particle size ($D_{50}$) of 10 μm to 12 μm.

2. The negative electrode of claim 1, wherein the average particle size ($D_{50}$) of the second active material particles is 14% to 95% of the average particle size ($D_{50}$) of the primary particles.

3. The negative electrode of claim 1, wherein the primary particles have an average particle size ($D_{50}$) of 5 μm to 20 μm.

4. The negative electrode of claim 1, wherein the first active material particles have an average particle size ($D_{50}$) of 10 μm to 35 μm.

5. The negative electrode of claim 1, wherein the first active material particles have a specific surface area of 1.3 m²/g to 1.5 m²/g.

6. The negative electrode of claim 1, wherein the second active material particles have a specific surface area of 1.4 m²/g to 1.6 m²/g.

7. The negative electrode of claim 1, wherein the second active material particles are included at 20 wt % to 90 wt % with respect to a total weight of the first active material particles and the second active material particles.

8. The negative electrode of claim 1, wherein the total weight of the first active material particles and the second active material particles is 90 wt % to 99.9 wt % with respect to a total weight of the negative electrode active material layer.

9. The negative electrode of claim 1, wherein the second active material particle is at least one selected from the group consisting of artificial graphite, natural graphite, graphitized carbon fiber, and graphitized mesocarbon microbeads.

10. A secondary battery comprising:
    the negative electrode of claim 1;
    a positive electrode;
    a separator interposed between the positive electrode and the negative electrode; and
    an electrolyte.

11. A battery module comprising the secondary battery of claim 10 as a unit cell.

12. A battery pack comprising the battery module of claim 11 and used as a power source for devices.

13. The battery pack of claim 12, wherein the device is an electric vehicle, a hybrid electric vehicle, a plug-in hybrid electric vehicle, or a power storage device.

* * * * *